US008939309B2

(12) United States Patent
Meacham

(10) Patent No.: US 8,939,309 B2
(45) Date of Patent: Jan. 27, 2015

(54) CROSSBAR ASSEMBLY

(75) Inventor: William Shane Meacham, Myrtle Beach, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 229 days.

(21) Appl. No.: 13/432,569

(22) Filed: Mar. 28, 2012

(65) Prior Publication Data

US 2013/0256324 A1    Oct. 3, 2013

(51) Int. Cl.
*B65D 45/28* (2006.01)
*E05B 73/00* (2006.01)
*E05C 19/00* (2006.01)

(52) U.S. Cl.
CPC ............... *B65D 45/28* (2013.01); *E05B 73/00* (2013.01)
USPC ............................ 220/314; 70/14; 292/259 R

(58) Field of Classification Search
CPC .. B60R 25/0225; B65D 43/14; B65D 45/025; B65D 90/10; B65D 90/22; E05C 19/003; E05C 19/186; E05C 2007/007
USPC ..................... 220/810, 811, 243–251, 254.1, 220/287–291, 314, 324; 114/202, 203; 70/208, 14, 225, 226; 292/259 R, 289, 292/290
See application file for complete search history.

(56) References Cited

U.S. PATENT DOCUMENTS

| 2,542,621 | A | * | 2/1951 | Bober | 294/34 |
| 3,230,720 | A | * | 1/1966 | Bennett | 405/282 |
| 4,650,383 | A | * | 3/1987 | Hoff | 410/149 |
| 5,042,612 | A | | 8/1991 | Bennet et al. | |
| 5,778,709 | A | * | 7/1998 | Hsu | 70/209 |
| 6,039,522 | A | * | 3/2000 | Cardona | 410/127 |
| 6,282,930 | B1 | * | 9/2001 | Strauss et al. | 70/209 |
| 6,553,797 | B2 | * | 4/2003 | Witchey | 70/209 |
| 6,746,183 | B1 | * | 6/2004 | Sullivan | 405/272 |
| 7,216,741 | B2 | | 5/2007 | MacDonald et al. | |
| 7,640,682 | B1 | * | 1/2010 | Buckbee | 37/281 |
| 2002/0166291 | A1 | * | 11/2002 | Campbell et al. | 52/20 |

\* cited by examiner

*Primary Examiner* — Robert J Hicks
*Assistant Examiner* — Shawn M Braden
(74) *Attorney, Agent, or Firm* — Amy Allen Hinson; Nexsen Pruet, LLC

(57) ABSTRACT

A crossbar assembly for use in connection with a hatch on the upper surface of a container is disclosed. The crossbar assembly may include a main body and an adjustable body. The adjustable body is preferably slideably aligned with the main body and preferably includes an adjusting device attached to the main body and the adjustable body for transitioning the adjustable body between positions along the main body. Two extenders may be positioned extending outwardly from the main body and the adjustable body. The main body and adjustable body also may each include stops for securing the crossbar assembly within the hatch of the container so as to preferably prevent workers from falling into the hatch.

26 Claims, 4 Drawing Sheets

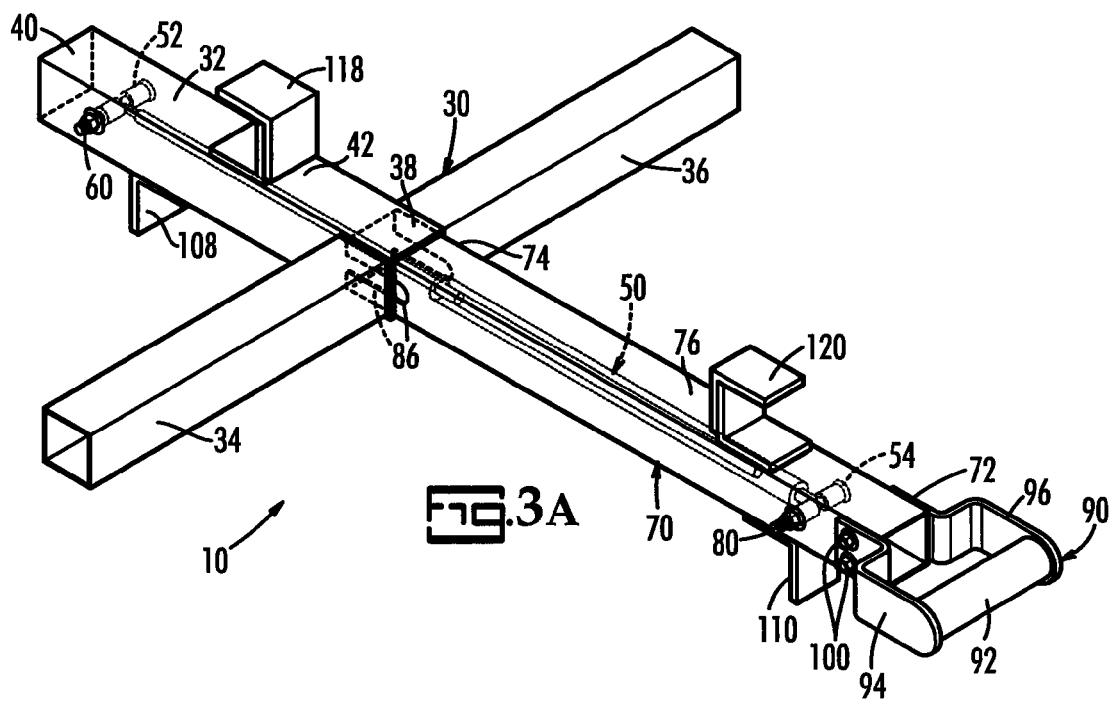
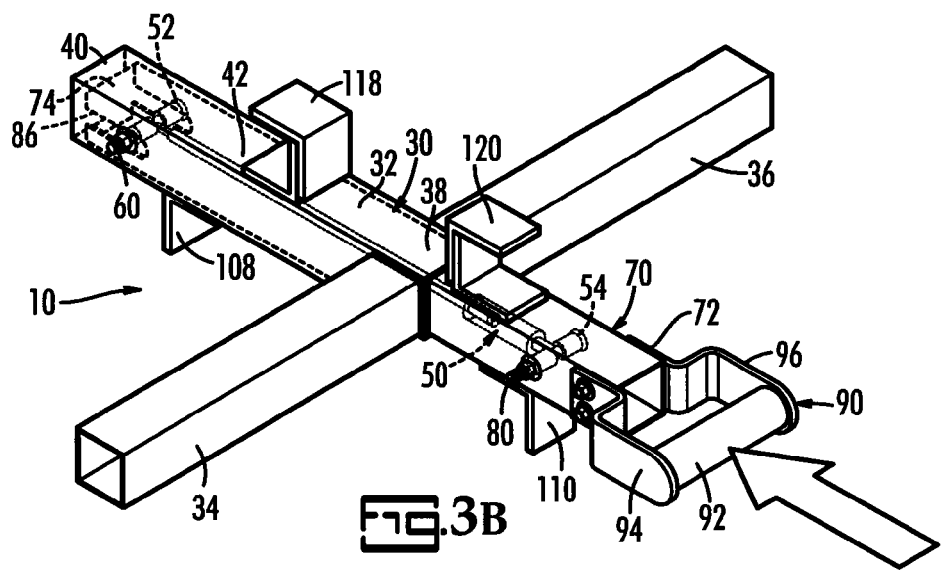

CROSSBAR ASSEMBLY

BACKGROUND

The present invention discloses a crossbar assembly particularly suitable for use in connection with hatches on the upper surface of a container, such as a transport truck.

It is frequently necessary to access the upper surface of containers such as transport trucks. Such containers are constantly refilled and require service, monitoring, and maintenance. To perform these functions, however, it is often necessary to open the hatches on the containers. Unfortunately, open hatches on the upper surface of containers pose significant dangers to workers working around these open hatches due to the increased risk of someone falling into the container through the open hatch. Indeed many such containers are filled with highly toxic chemicals, gases, and materials.

Thus there is a need in the art for an effective device for use in connection with hatches positioned on the upper surface of a container to prevent workers from falling into the hatches.

SUMMARY

The present invention provides a crossbar assembly for use in connection with a hatch on the upper surface of a container. In one embodiment of the present invention, the crossbar assembly includes a main body having a first end, a second end, a first stop, and a first open interior. The crossbar assembly also includes an adjustable body having a third end, a fourth end, a second stop, and a second open interior. The adjustable body is aligned with the main body wherein the adjustable body slides along the main body within the first open interior of the main body. The crossbar assembly also includes an adjusting device having a first connector, a second connector, and an expandable body positioned therebetween. The first connector is attached to the second end of the main body within the first open interior of the main body and the second connector is attached to the fourth end of the adjustable body within the second open interior of the adjustable body. The adjusting device is for transitioning the adjustable body from a first position to a second position along the main body. Further, the first stop of the main body and the second stop of the adjustable body are for securing the crossbar assembly within the hatch of the container.

In an alternative embodiment of the crossbar assembly of the present invention, the crossbar assembly includes a main body having a first end, a second end, and a first stop. The crossbar assembly also includes an adjustable body having a third end, a fourth end, and a second stop. The adjustable body is aligned with the main body so that the adjustable body slides along the main body. The crossbar assembly also includes a first extender extending outward in a first direction from the main body and the adjustable body and a second extender extending outward in a second direction from the main body and the adjustable body. An adjusting device is attached to the main body and the adjustable body for transitioning the adjustable body between positions along the main body. Further, the first stop of the main body and the second stop of the adjustable body are for securing the crossbar assembly within the hatch of the container.

In yet another alternative embodiment of the crossbar assembly of the present invention, the crossbar assembly includes a first body having a first end, a second end, a first stop, and a first open interior. The crossbar assembly also includes a second body having a third end, a fourth end, and a second stop. The second body is aligned within the open interior of the first body so that the second body slides along the first body within the first open interior causing the crossbar assembly to slide between an expanded position and a retracted position. The crossbar assembly also includes a first extender attached to the first body, a second extender attached to the first body, and an adjusting device attached to the first body and the second body. The adjusting device is for positioning the crossbar assembly in the expanded position and the retracted position. Further, the first stop of the first body and the second stop of the second body are for securing the crossbar assembly within the hatch of the container.

BRIEF DESCRIPTION OF THE DRAWINGS

FIG. 3A is a perspective view of a crossbar assembly in an expanded configuration according to an embodiment of the present invention.

FIG. 3B is a perspective view of a crossbar assembly in a retracted configuration according to an embodiment of the present invention.

DESCRIPTION OF REPRESENTATIVE EMBODIMENTS

The present invention is related to a crossbar assembly that is particularly suitable for use in connection with a hatch on the upper surface of a container such as a tanker truck. The unique design and features of the crossbar assembly preferably allow the crossbar assembly to attach to the open hatch of a container to assist in preventing workers from falling into the open hatch when performing functions such as service or maintenance on the upper surface of the container or when opening and closing the hatches of the container. Although primarily described herein in terms of its use with transport vehicles and tanker trucks, it will be clear that the crossbar assembly of the present invention may also be used in connection with a variety of other devices and containers. The invention will be described with reference to the figures forming an integral non-limiting part of the instant specification. Throughout the description, similar elements will be numbered accordingly.

Figure 1:
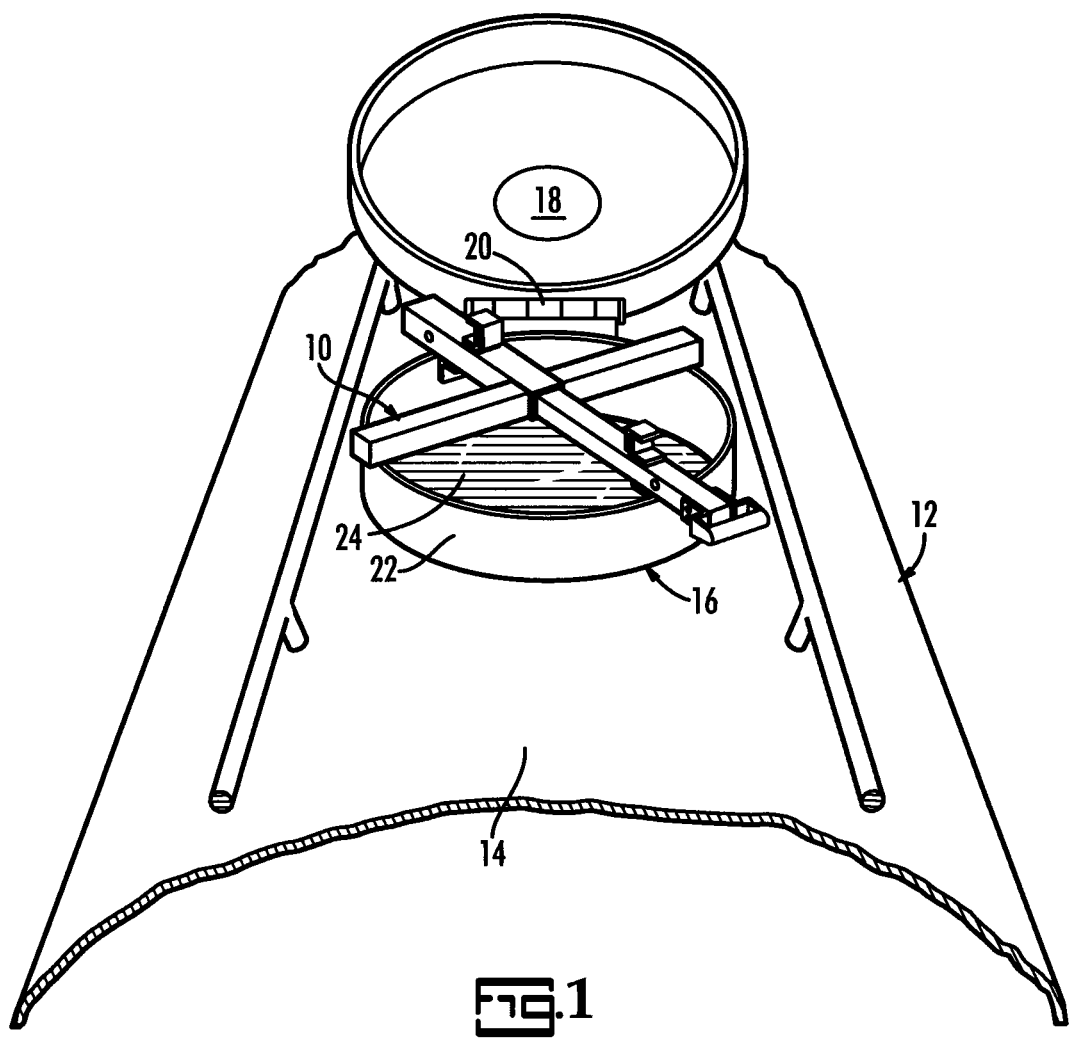
FIG. 1 is a perspective view of a crossbar assembly affixed within the hatch of a tanker truck according to an embodiment of the present invention.

FIG. 1 represents an embodiment of the crossbar assembly 10 of the present invention affixed to a hatch 16 on the upper surface 14 of a tanker truck 12. In the embodiment disclosed in FIG. 1, the hatch 16 includes a hatch lid 18, a hinge 20 for opening and closing the hatch lid 18, and a rim 22 surrounding an opening 24 for refilling tanker truck 14 with various types of materials and chemicals. In the disclosed embodiment, the crossbar assembly 10 is positioned at opening 24 and secures to the rim 22 of hatch 16 to prevent workers from falling into opening 24 of the tanker truck, which may be filled with toxic materials, chemicals, and/or gases.

Figure 2:
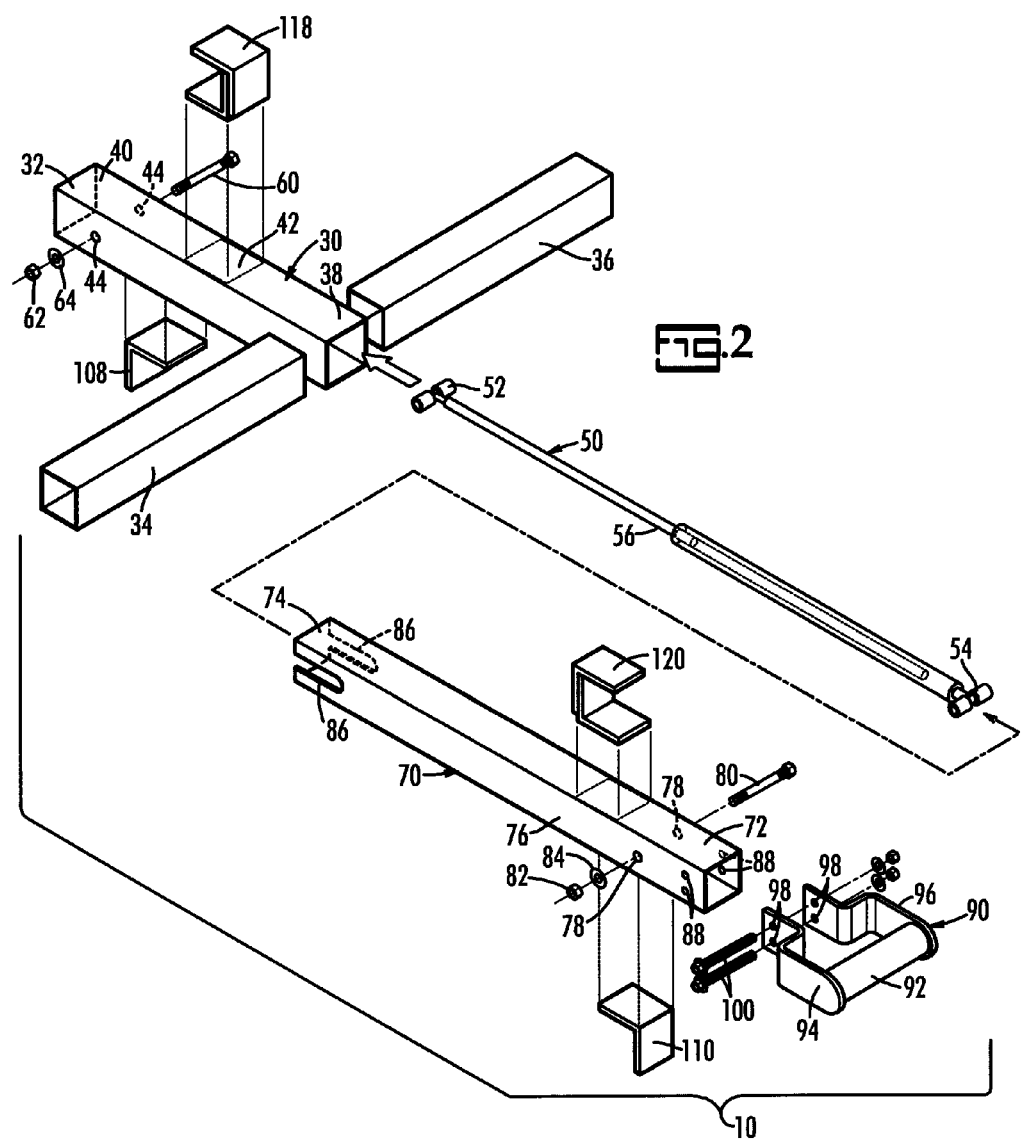
FIG. 2 is an exploded view of a crossbar assembly according to an embodiment of the present invention.

FIG. 2 discloses an exploded view of an embodiment of the crossbar assembly. In this embodiment, the crossbar assembly includes a brace such as T brace 30 having a main extender 32, a first side extender 34 and an opposing second side extender 36. The main extender 32 includes a first end 38, a second end 40, and a middle section 42. In this embodiment, the first and second side extenders, 34 and 36, respectively, are positioned adjacent to the first end 38 of main extended 32 and each extend in opposing perpendicular directions from main extended 32 to form a generally T shape.

In one embodiment, T brace 30 is formed from aluminum. In an alternative embodiment, T brace 30 is formed from steel or stainless steel. In yet another alternative embodiment, non-metal materials or composite materials are used to form the components of the T brace. Moreover, in one embodiment, T brace 30 is integrally formed from a single piece of material. In an alternative embodiment, T brace 30 is formed from three separate components wherein first and second side extenders, 34 and 36, respectively, are affixed to main extended 32, such as by welding.

In the embodiment disclosed in FIG. 2, extenders 32, 34, and 36 are all hollow tubing. In an alternative embodiment, solid tubing is used. Utilizing hollow tubing may decrease the weight of the crossbar assembly and thereby make it easier to transport and attach to hatch 16, but utilizing solid tubing alternatively may increase the strength of the crossbar assembly. When hollow tubing is used for the extenders 32, 34, and 36, strengthening ribs may be incorporated along the hollow tubing to increase the strength of the extenders 32, 34, and 36. When solid tubing is used, lighter materials, such as composite materials may be preferred to reduce the weight of the crossbar assembly. Furthermore, the extenders 32, 34, and 36 shown in FIG. 2 are all rectangular or square shaped. Alternative shapes however may be utilized without departing from the spirit and the scope of the present invention. In one embodiment where hollow tubing is used for extenders 32, 34, and 36, removable caps may be incorporated at the far ends to keep debris from getting into the extenders 32, 34, and 36.

In the embodiment shown in FIG. 2, main extender 32 is hollow to allow for insertion of an adjusting device such as a gas spring or a gas strut 50. Gas strut 50 preferably includes a first end having a first connector 52 and a second end having a second connector 54. Extending between axles 52 and 54 is the gas strut body 56. The first end of gas strut 50 having first connector 52 is preferably inserted into main extender 32. First connector 52 may be secured within main extender 32 by a securing device such as axle 60. In the disclosed embodiment, axle 60 is inserted into openings 44 at the second end 40 of main extender 32 and through connector 52 of gas strut 50. Axle 60 may be secured in place using securing devices such as nut 62 and washer 64. Other types of securing devices may be used without departing from the spirit and the scope of the present invention.

The second end of gas strut 50 having second connector 54 is preferably inserted into an adjustable extender 70. In the embodiment disclosed in FIG. 2, the adjustable extender 70 includes a first end 72, a second end 74, and a middle section 76. Second connector 54 may be secured within adjustable extender 70 by a securing device such as axle 80. In the disclosed embodiment, axle 80 is inserted into openings 78 at the first end 72 of adjustable extender 70 and through connector 54 of gas strut 50. Axle 80 may be secured in place using securing devices such as nut 82 and washer 84. Other types of securing devices may used without departing from the spirit and the scope of the present invention.

In the embodiment of the crossbar assembly 10 shown in FIGS. 3A and 3B, a portion of adjustable extender 70 is preferably positioned within main extender 32. The second end 74 of adjustable extender 70 may include grooves or openings 86. In the embodiment shown in FIGS. 2, 3A, and 3B, openings 86 form arch like shapes and provide clearance around axle 60 when adjustable extender 70 is positioned in the fully retracted position, such as shown in FIG. 3B.

Similar to T brace 30, adjustable extender 70 may be formed from aluminum. In an alternative embodiment, adjustable extender 70 is formed from steel or stainless steel. In yet another alternative embodiment, non-metal materials or composite materials are used to form adjustable extender 70. Furthermore, in the embodiment disclosed in FIGS. 2, 3A, and 3B, adjustable extender 70 is a hollow tubing. In an alternative embodiment, solid tubing is used. When hollow tubing is used for the adjustable extender 70, strengthening ribs may be incorporated along the hollow tubing to increase the strength of the adjustable extender. Such ribbing may be shortened so that the ribbing does not interfere with the gas strut 50. While the adjustable extender 70 of the embodiment disclosed in FIGS. 2, 3A, and 3B is rectangular or square shaped, alternative shapes may be utilized without departing from the spirit and the scope of the present invention. Moreover, a cap, such as a removable cap, may be included at the far end of adjustable extender 70 to keep debris from getting into the crossbar assembly.

In the embodiment shown in FIG. 2, adjustable extender 70 includes a handle 90. In an alternative embodiment, main extender 32 includes a handle. The handle 90 may include a handle bar 92 and a first and second bracket, 94 and 96, respectively, extending from each side of handle bar 92. In one embodiment, handle bar 92 is affixed to brackets 94 and 96 such as by welding. In another embodiment, handle bar 92 is affixed to brackets 94 and 96 through an opening in brackets 94 and 96 and then secured via bolts. In the embodiment disclosed in FIG. 2, brackets 94 and 96 include openings 98 for affixing to the first end 72 of adjustable extender 70. For example, brackets 94 and 96 are inserted into the first end 72 of adjustable extender 70, which includes openings 88. The openings 98 and 88 are then aligned and secured using a securing device such as an axle 100. In the embodiment disclosed in FIG. 2, each bracket 94 and 96 includes two openings 98 and each side of adjustable extender 70 includes two openings 88. Two axles 100 are therefore used in this embodiment. More or less openings and/or securing devices may be used.

In the embodiment of FIG. 2, main extender 32 and adjustable extender 70 includes hatch securing or stopping devices such as L brackets 108 and 110, respectively. In this embodiment, one side of L bracket 108 is secured, such as by welding or bolts, to main extender 32 and one side of L bracket 110 is secured to adjustable extender 70. In this embodiment, L bracket 108 is attached near the middle section 42 of main extender 32 and L bracket 110 is attached between the middle section 76 and first end 72 of adjustable extender 70 so that it does not interfere with adjustable extender 70 sliding into main extender 32. The L brackets 108 and 110 face inward towards the center of the crossbar assembly thereby allowing the extenders 32 and 70 to directly rest on rim 22 of the hatch 16. In another embodiment, the L brackets 108 and 110 face outward away from the center of the crossbar assembly, which may allow the L brackets 108 and 110 to rest directly on rim 22 of the hatch 16. The embodiments of FIGS. 1, 2, 3A, and 3B disclose L bracket securing devices on the main extender 32 and the adjustable extender 70, but more or less securing devices may be used for securing the crossbar assembly to hatch 16.

Figure 4:
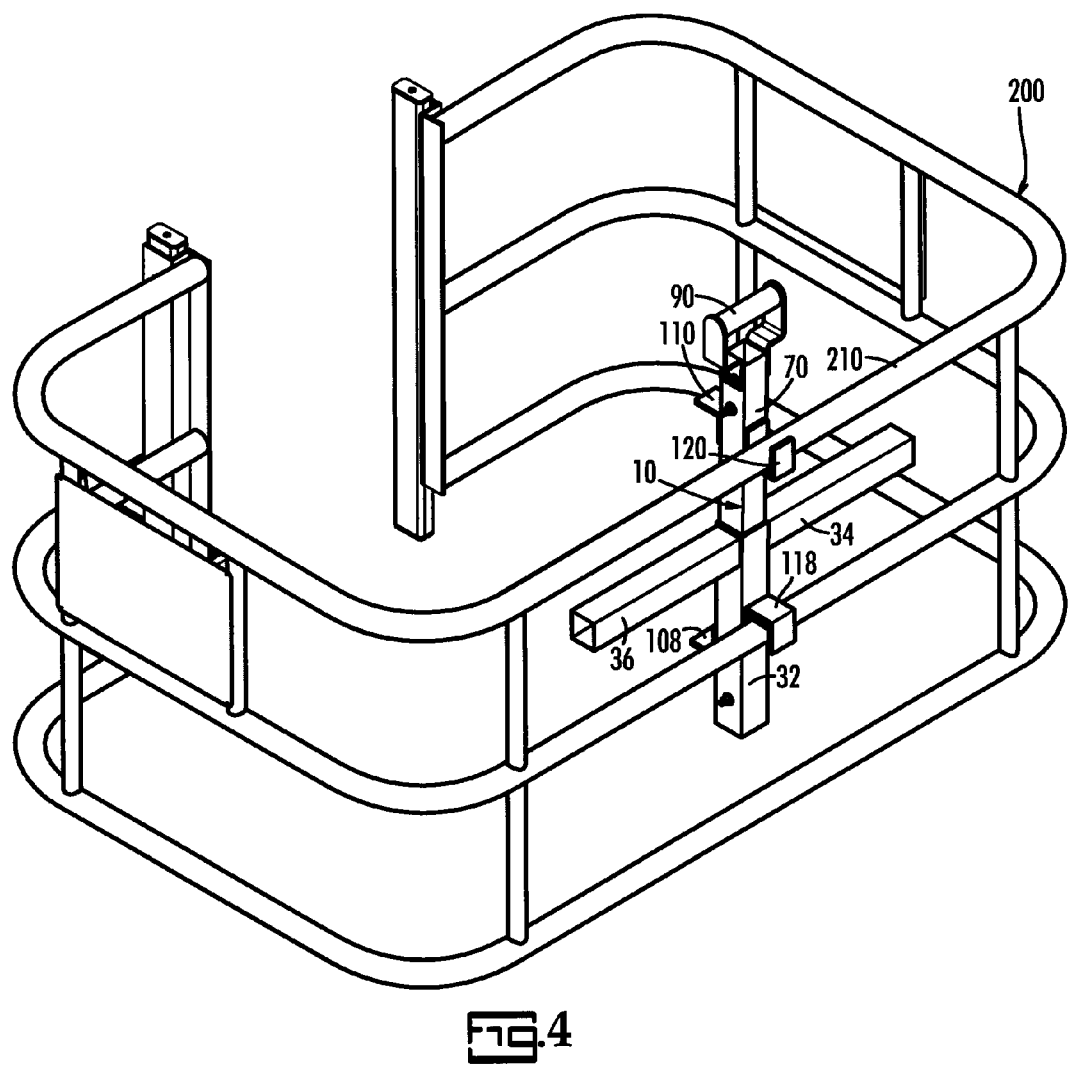
FIG. 4 is a perspective view of a crossbar assembly affixed to the rails of a safety cage according to an embodiment of the present invention.

Further, main extender 32 and adjustable extender 70 may also include storage connectors such as C brackets 118 and 120, respectively. C brackets 118 and 120 are particularly suitable for securing crossbar assembly 10 to the rails 210 of a safety cage 200 such as shown in FIG. 4. In the embodiment shown in FIG. 2, two L brackets are overlapped and secured together, such as by welding, to form the C brackets. Moreover, in this embodiment, one side of C bracket 118 is secured, such as by welding or bolts, to main extender 32 and one side of C bracket 120 is secured to adjustable extender 70. In this embodiment, C bracket 118 is attached near the middle section 42 of main extender 32 and C bracket 120 is attached between the middle section 76 and first end 72 of adjustable extender 70 so that it does not interfere with adjustable extender 70 sliding into main extender 32. The C brackets 118 and 120 face outward away from the center of the crossbar assembly. Alternatively, the C brackets 118 and 120 may face inward towards the center of the crossbar assembly. Facing the C brackets 118 and 120 outward away from the center of the crossbar assembly may be beneficial when storing the crossbar assembly on a variety of safety cage apparatuses such as the safety cage apparatus disclosed in FIG. 4 as well as the safety cage apparatuses disclosed in U.S. Pat. Nos. 5,042,612 and 7,216,741, which are incorporated herein. The embodiments of FIGS. 1 through 4 disclose a C bracket rail storage device on the main extender 32 and the adjustable extender 70, but more or less and other forms of storage devices may be used to assist with storage of the crossbar assembly when not in use without departing from the spirit and the scope of the present invention.

As discussed above, the crossbar assembly 10 may be stored between the rails 210 of a safety cage 200, such as shown in FIG. 4. To position the crossbar assembly 10 within the rails 210 of a safety cage 200, the crossbar assembly 10 may be positioned in the retracted position shown in FIG. 3B. The crossbar assembly 10 may then be positioned between two rails 210 of the safety cage 200 and the handle 90 may be pulled causing the gas strut 50 to extend and adjustable extender 70 to slide out of main extender 32. Once the crossbar assembly 10 is expanded enough that the rails 210 of the safety cage are securely positioned within the openings or pockets of C brackets 118 and 120, the handle can be released and the crossbar assembly is securely stored along the rails 210 of the safety cage 200 until it is time to use the crossbar assembly to cover a hatch. In one embodiment, the crossbar assembly includes one or multiple locking mechanisms to more securely lock crossbar assembly 10 within a position on the rail of the safety cage. Furthermore, in another embodiment, the crossbar assembly is not secured to the safety cage but instead is secured to the upper surface of the container using securing means known in the art. In yet another alternative embodiment, the crossbar assembly is installed within the hatch and removal of the crossbar assembly is not necessary when opening and closing the hatch lid.

When it is necessary to remove the crossbar assembly 10 from the rails of a safety cage so that it can be used in connection with a container hatch, such as shown in FIG. 1, the handle 90 may be pressed inward causing the crossbar assembly 10 to retract. Once the crossbar assembly has retracted enough for the C brackets 118 and 120 to be free from the safety cage rails 210, the crossbar assembly 10 may be removed from the safety cage rails 210 and positioned near the hatch 16 on the upper surface 14 of a container, such as the tanker truck 12 shown in FIG. 1. The hatch lid 18 may then be opened and crossbar assembly 10 may be inserted over opening 24 of hatch 16. To secure the crossbar assembly 10 to the rim 22 of hatch 16, the bracket 108 of main extender 32 may be lined up with the inside edge of rim 22 of hatch 16. The handle 90 may then be pulled outward causing the gas strut 50 to expand, adjustable extender 70 to move outside of main extender 32, and the crossbar assembly 10 to lengthen, such as shown in FIG. 3A. When the bracket 110 of adjustable extender 70 also becomes flush with the inside opposing edge of rim 22 of hatch 16, the handle can be released and the crossbar assembly 10 is secured to the hatch 16 to preferably prevent workers from falling into opening 24. In one embodiment, the crossbar assembly includes one or multiple locking mechanisms to more securely lock crossbar assembly 10 within a position while positioned on hatch 16.

When it is time to close hatch lid 18 of hatch 16, the crossbar assembly may be removed by pushing in handle 90 causing the gas strut 50 to retract, adjustable extender 70 to slide into main extender 32, and the crossbar assembly 10 to shorten, such as shown in FIG. 3B. Once the brackets 110 and 108 of adjustable extender 70 and main extender 32, respectively, are free from the rim 22 of hatch 16, the crossbar assembly 10 can be removed from hatch 16 and lid 18 may be closed. Crossbar assembly 10 may then be stored, such as by securing it to the safety cage rails 210 as shown in FIG. 4 and discussed herein above.

Washers and/or spacers may be positioned as needed between securing devices and extenders to ensure a more effective connection. Furthermore, the number of openings and securing devices may vary. Indeed, other devices and techniques may be used for attaching and/or securing the various parts and components of the crossbar assembly of the present invention without departing from the spirit and the scope of the present invention. In the embodiment shown, the crossbar assembly includes four extenders. More or less extenders may be used. For example, in another embodiment, only the main extender and adjustable extender are used. In yet another embodiment, additional side extenders are incorporated along the main extender and/or the adjustable extender. Moreover, in the embodiment shown, only the adjustable extender 70 includes a handle, but other extenders may also include handles.

The crossbar assembly is preferably sized to accommodate most container hatch configurations. As discussed above, however, the crossbar assembly is preferably adjustable to adapt to varying sizes of hatches, which thereby increases the usability of the crossbar assembly with a wide array of containers and hatch combinations.

It should be noted that there are several configurations suitable for the design of the crossbar assembly of the present invention, and the shapes, sizes, and dimensions of the parts of the crossbar assembly discussed above are for example only and represent but one of the configurations of the crossbar assembly. Other configurations altering the number of parts, attachment positions of the parts, means for attaching and securing the parts, and shapes, sizes, and dimensions of the parts could be employed to demonstrate the invention and are intended to be encompassed by the present invention. The description and drawings should not be deemed to narrow the scope of the present invention in any way.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that the figures, which highlight the functionality and advantages of the present invention, are presented for purposes of example only. The architecture of the present invention is sufficiently flexible and configurable, such that it may be used in ways other than that shown in the accompanying figures.

Further, the purpose of the Abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

What is claimed is:

1. A crossbar assembly for use in connection with a hatch on the upper surface of a container, said crossbar assembly comprising:
    a main body having a first end, a second end, a bottom surface extending between said first and second ends, a first stop, and a first open interior, wherein said first stop is positioned on said bottom surface;
    an adjustable body having a third end, a fourth end, a second stop, and a second open interior, said adjustable body is aligned with said main body wherein said adjustable body slides along said main body within said first open interior of said main body; and
    an adjusting device having a first connector, a second connector, and an expandable body positioned therebetween, said first connector is attached to said second end of said main body within said first open interior of said main body and said second connector is attached to said fourth end of said adjustable body within said second open interior of said adjustable body, said adjusting device for transitioning said adjustable body from a first position to a second position along said main body;
    wherein said first stop of said main body and said second stop of said adjustable body are for securing said crossbar assembly within the hatch of the container.

2. The apparatus of claim 1 wherein said main body further comprises a first extender attached at said first end of said main body.

3. The apparatus of claim 2 wherein said main body further comprises a second extender attached at said first end of said main body.

4. The apparatus of claim 3 wherein said main body, said first extender, and said second extender form a generally T shape.

5. The apparatus of claim 1 wherein said adjustable body includes a handle attached at said fourth end and wherein when pressure is applied to said handle, said adjustable body slides along said main body.

6. The apparatus of claim 1 wherein said adjustable body includes a groove at said third end.

7. The apparatus of claim 1 wherein said adjusting device is a gas strut.

8. The apparatus of claim 1 wherein said main body further comprises a first storage bracket and said adjustable body further comprises a second storage bracket.

9. The apparatus of claim 8 wherein said first and second storage brackets are for removably attaching to a side of a safety cage apparatus.

10. A crossbar assembly for use in connection with a hatch on the upper surface of a container, said crossbar assembly comprising:
    a main body having a first end, a second end, and a first stop;
    an adjustable body having a third end, a fourth end, and a second stop, said adjustable body is aligned with said main body and wherein said adjustable body slides along said main body;
    a first extender extending outward in a first direction from said main body and rigidly affixed to said main body;
    a second extender extending outward in a second direction from said main body and rigidly affixed to said main body; and
    an adjusting device attached to said main body and said adjustable body, said adjusting device for transitioning said adjustable body between positions along said main body, said adjusting device comprises a gas strut;
    wherein said first stop of said main body and said second stop of said adjustable body are for securing said crossbar assembly within the hatch of the container.

11. The apparatus of claim 10 wherein said first extender and said second extender are attached at said first end of said main body.

12. The apparatus of claim 11 wherein said first and second directions are opposing approximately perpendicular directions to said main body.

13. The apparatus of claim 10 wherein said adjustable body includes a handle attached at said fourth end.

14. The apparatus of claim 13 wherein when pressure is applied to said handle, said adjustable body slides along said main body.

15. The apparatus of claim 10 wherein said main body further comprises an open interior and said adjustable body slides along said main body within said open interior.

16. The apparatus of claim 10 wherein said main body further comprises a first storage bracket and said adjustable body further comprises a second storage bracket.

17. The apparatus of claim 16 wherein said first and second storage brackets are for removably attaching to a side of a safety cage apparatus.

18. A crossbar assembly for use in connection with a hatch on the upper surface of a container, said crossbar assembly comprising:
    a first body having a first end, a second end, a first stop, and a first open interior;
    a second body having a third end, a fourth end, and a second stop, said second body is aligned within said open interior of said first body, wherein said second body slides along said first body within said first open interior causing said crossbar assembly to slide between an expanded position and a retracted position;
    a first extender rigidly attached to said first body whereby movement is prevented therebetween;
    a second extender rigidly attached to said first body whereby movement is prevented therebetween; and
    an adjusting device attached to said first body and said second body, said adjusting device is for positioning said crossbar assembly in said expanded position and said retracted position;
    wherein said first stop of said first body and said second stop of said second body are for securing said crossbar assembly within the hatch of the container.

19. The apparatus of claim 18 wherein said first extender and said second extender are attached at said first end of said first body.

20. The apparatus of claim 19 wherein said first body, said first extender, and said second extender form a generally T shape.

21. The apparatus of claim 20 wherein said first body, said second body, said first extender, and said second extender form a generally cross shape.

22. The apparatus of claim 18 wherein said second body includes a handle attached at said fourth end and wherein said handle facilitates said second body sliding along said first body.

23. The apparatus of claim 18 wherein said adjusting device is a gas strut.

24. The apparatus of claim 18 wherein said second body further comprises a second open interior.

25. The apparatus of claim 24 wherein said adjusting device comprises a first connector, a second connector, and an expandable body positioned therebetween, said first connector is attached to said second end of said first body within said first open interior of said first body and said second connector is attached to said fourth end of said second body within said second open interior of said adjustable body.

26. The apparatus of claim 1 wherein said adjustable body further comprises a lower surface extending between said third and fourth ends wherein said second stop is positioned on said lower surface.

\* \* \* \* \*